Patented Jan. 7, 1930

1,742,509

UNITED STATES PATENT OFFICE

CLARENCE I. B. HENNING AND CHARLES E. BURKE, OF WILMINGTON, DELAWARE, AND EBENEZER EMMET REID, OF BALTIMORE, MARYLAND, ASSIGNORS TO E. I. DU PONT DE NEMOURS & COMPANY, OF WILMINGTON, DELAWARE, A CORPORATION OF DELAWARE

COATING COMPOSITION

No Drawing. Original application filed September 24, 1924, Serial No. 739,689. Divided and this application filed July 5, 1929. Serial No. 376,273.

This invention relates to new compositions of matter including heavy metal salts of a monoalkyl or monoaryl ester of phthalic acid. These new salts are characterized by containing the following atomic grouping:

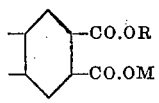

the neural salts having the following general graphical formula:

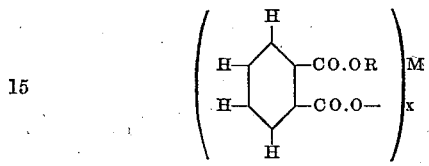

where R represents an alkyl or aryl radical preferably not containing more than one ring of carbon atoms such, for example, as methyl ($CH_3-$), ethyl ($C_2H_5-$), cyclohexyl ($C_6H_{11}-$), benzyl ($C_7H_7-$), phenyl ($C_6H_5-$); M represents the radical of iron, copper or zinc; and $x$ stands for the number of effective valencies of said metal.

Compounds of this general type may be readily prepared by intimately mixing an aqueous solution of the sodium salt of the monoalkyl phthalic acid with a solution of a soluble salt of a corresponding heavy metal, in which case the metal phthalic ester precipitates and can be separated from the supernatant liquid. If desired the compounds so prepared can be further purified by dissolving in ether, filtering any insoluble residue and then distilling off the ether.

The ferrous and ferric neutral salts of the monoalkyl esters of phthalic acid (such as the salts of the n-butyl ester) are brownish red compounds; the corresponding zinc salt is substantially colorless and the cupric salt is blue. These salts exist, at least initially, in the form of viscous oils, except the copper salts, which are crystalline at ordinary room temperatures. The ferric salts are somewhat unstable in the pressure of water. The zinc salt is unstable at temperatures above 100° C.

The colors of the iron salts of the monoalkyl esters of phthalic acid, and the colors of films, such as nitrocellulose films, containing these salts, are remarkably fast to both visible and ultra-violet light.

We have discovered that compounds of this type are soluble in many organic solvents such as ether and acetone, and render available an excellent method of intimately incorporating compounds containing the heavy metals with other organic substances where they may function, for example as drying agents in paints and varnishes, or as catalytic agents in the carrying out of other chemical reactions, as for example, hydrogenation.

Furthermore, we have also discovered that substances of this type form colloids with nitrocellulose and are, therefore, particularly adapted for use in cases where it is desirable to intimately incorporate a metal-containing compound with nitrocellulose.

As an example of the use according to our invention of one of the above-mentioned organo-metallic compounds, a nitrocellulose film of the following composition might be cited:

Pyroxylin _____ 10 parts
Zinc n-butyl phthalate _____ 5 parts
Volatile solvent _____ as required The pyroxylin and zinc butyl phthalate are colloided in the same way that pyroxylin and camphor would be, and the volatile solvent added to give the required consistency. Films prepared in this way are found to be uniform, transparent and possess other qualities which make them satisfactory for many purposes.

No claims are made herein to the zinc salt or any other salts of monoalkyl esters of phthalic acid except iron and copper salts, as these are covered in applicants' co-pending application Serial No. 295,840, filed July 27, 1928.

This application is a division of our application Serial No. 739,689 filed September 24, 1924.

We claim:

1. A lacquer film comprising a mixture of nitrocellulose and a member of the group which consists of iron salts and copper salts of alkyl half-esters of phthalic acid.

2. A lacquer film comprising a mixture of nitrocellulose and a member of the group which consists of the iron salt and the copper salt of the butyl half-ester of phtahalic acid.

3. A lacquer film comprising a mixture of nitrocellulose and the iron salt of the butyl half-ester of phthalic acid.

4. A lacquer composition comprising a mixture of nitrocellulose and a member of the group which consists of iron salts and copper salts of alkyl half-esters of phthalic acid dissolved in a volatile solvent for nitrocellulose.

5. A lacquer composition comprising a mixture of nitrocellulose and a member of the group which consists of the iron salt and the copper salt of the butyl half-ester of phthalic acid dissolved in a volatile solvent for nitrocellulose.

6. A lacquer composition comprising a mixture of nitrocellulose, the iron salt of the butyl half-ester of phthalic acid, and a volatile solvent mixture.

7. A composition comprising a mixture of nitrocellulose and a member of the group which consists of iron salts and copper salts of alkyl half-esters of phthalic acid.

8. A composition comprising a mixture of nitrocellulose and a member of the group which consists of the iron salt and the copper salt of the butyl half-ester of phthalic acid.

9. A composition comprising a mixture of nitrocellulose, the iron salt of the butyl half-ester of phthalic acid, and a volatile solvent mixture.

10. A composition comprising the solution in a volatile solvent of a mixture containing nitrocellulose and the iron salt of the butyl half-ester of phthalic acid.

In testimony whereof we affix our signatures.

CLARENCE I. B. HENNING.
CHARLES E. BURKE.
EBENEZER EMMET REID.